United States Patent [19]
Wrigley et al.

[11] Patent Number: 5,899,245
[45] Date of Patent: May 4, 1999

[54] DEVICE FOR CONCURRENT DELIVERY OF MEASURED QUANTITIES OF AT LEAST TWO LIQUIDS

[75] Inventors: Andrew Nicholson Wrigley; Vaughan Bycroft, both of Auckland, New Zealand

[73] Assignee: R & A Bailey Company Limited, Dublin, Ireland

[21] Appl. No.: 08/945,728

[22] PCT Filed: May 13, 1996

[86] PCT No.: PCT/IE96/00028

§ 371 Date: Jan. 9, 1998

§ 102(e) Date: Jan. 9, 1998

[87] PCT Pub. No.: WO96/35633

PCT Pub. Date: Nov. 14, 1996

[30] Foreign Application Priority Data

May 11, 1995 [IE] Ireland ...................................... 950339

[51] Int. Cl.⁶ ................................ B67D 3/02; G01F 11/32
[52] U.S. Cl. .......................... 141/100; 141/351; 141/362; 222/129.4; 222/429; 222/442; 222/453
[58] Field of Search .............................. 141/9, 100, 351, 141/360–362; 222/129.3, 129.4, 426–430, 442, 449–451, 453

[56] References Cited

U.S. PATENT DOCUMENTS

| 2,201,545 | 5/1940 | Mazzanobile | 141/100 |
| 2,740,571 | 4/1956 | Busto | 222/427 |
| 2,873,050 | 2/1959 | Halverson | 222/449 |
| 3,256,916 | 6/1966 | Silletti | 141/100 |
| 3,509,920 | 5/1970 | Word | 141/100 |
| 3,567,075 | 3/1971 | Neri | 222/129.4 |
| 4,126,164 | 11/1978 | Magnifico | 141/100 |
| 5,163,488 | 11/1992 | Basch | 141/100 |

FOREIGN PATENT DOCUMENTS

519621 4/1940 United Kingdom .

*Primary Examiner*—J. Casimer Jacyna
*Attorney, Agent, or Firm*—Jacobson, Price, Holman & Stern, PLLC

[57] ABSTRACT

A measure for dispensing measured quantities of two liquors from a pair of bottles has a pair of measuring and receiving bowls associated with the bottles. Sleeves engage within necks of the bottles for delivery of liquid from each bottle to an associated bowl. Valve members in each bowl have normally open inlet liquid seals which cooperate with the sleeves to control filling of the bowls. Outlet liquid seals on the valve members normally close liquid outlets of the bowls. An actuating lever is operable to raise the valve members, moving the seals upwardly for opening the outlets and closing the inlets of the bowls. Thus, liquid measures flow from the bowls substantially concurrently into a glass or the like placed below the liquid outlets. The outlets are arranged to direct the two liquids to opposite sides of the glass so that the liquids remain separated within the glass. Release of the actuating lever drops the valve members closing the liquid outlets and opening the inlets for recharging the bowls.

18 Claims, 10 Drawing Sheets

DEVICE FOR CONCURRENT DELIVERY OF MEASURED QUANTITIES OF AT LEAST TWO LIQUIDS

FIELD OF THE INVENTION

The invention relates to a measure and in particular to a measure for delivering at least two different liquids from containers.

BACKGROUND OF THE INVENTION

A new liqueur product has recently been introduced which is provided in a single container having two sub-containers, one for each of two liqueurs. One of the liqueurs is a white coloured cream liqueur and the other is a dark coloured coffee liqueur. The cream coloured liqueur, when dispensed, lies on top of the dark liqueur and presents an aesthetically pleasing and pleasant tasting liqueur drink. Usually, the sub-containers are closed by separate stoppers which are removed for dispensing the liqueurs.

There is a need for a measuring device, particularly for use with the new liqueur product which will facilitate automatic dispensing at a point of sale location such as a bar or restaurant.

More particularly, the invention relates to a dispensing measure for delivery of measured quantities of at least two different liquids, the measure comprising:
- a head part having separate engagement means for engagement with the necks of adjacent bottles, each engagement means having a liquid inlet closable by a liquid inlet valve means;
- a measuring receiving bowl associated with each liquid inlet, each measuring receiving bowl having an air passageway closable by an air valve means, and a liquid outlet closable by a liquid valve outlet means; and
- actuating means for operating the valve means to deliver measured quantities of liquids from the measuring receiving bowls.

GB-A-519,621 describes apparatus for delivering measured quantities of liquids comprising two dispensing devices and a common mixing chamber connected to the outlet members for dispensing a beverage mixture made up of two or more liquids or a solution of a syrup in water.

SUMMARY OF THE INVENTION

The invention is characterised in that the liquid outlets are arranged for substantially direct delivery of separate divergent streams of the liquids from the measuring receiving bowls into a receptacle without mixing.

Advantageously, the dispensing measure according to the invention facilitates the automatic dispensing of measured amounts of liquids such as an associated pair of liqueurs in a controlled manner. Ideally, the liquid outlets are arranged for substantially concurrent delivery of the liquids to different locations, such as to opposite sides, in a receptacle. This facilitates pouring the liquids into the glass without mixing the liquids which are kept separate within the glass.

In a preferred embodiment of the invention the angle between the axes of adjacent liquid outlets is at least 90°, and preferably approximately 120°. This directs divergent streams of liquid into the glass to prevent mixing of the liquids.

Preferably the liquid outlets are at substantially the same level.

In another embodiment, the liquid valve means comprises a liquid valve member extending through the measuring receiving bowl from the liquid outlet to the liquid inlet, the valve member being movable in the measuring receiving bowl by the actuating means from a closed position in which the liquid outlet is sealed to an open position in which liquid is delivered from the measuring receiving bowl. Thus, conveniently operation of the actuator provides simultaneous operation of the liquid inlet valve and the liquid outlet valve, the valve member being movable through the bowl between the closed position in which the liquid outlet valve is closed and the liquid inlet valve is open for filling the bowl, and an open position in which the liquid outlet valve is open and the is liquid inlet valve is closed for discharging a measured amount of liquid from the bowl.

Preferably, the valve member is movable by the actuating means from a normally closed position in which the liquid outlet is sealed to an open position for delivery of liquid from the measuring receiving bowl.

In a further embodiment, the air valve means comprises an air valve member extending through an air inlet to the measuring receiving bowl, the air valve member being movable in the measuring receiving bowl by the actuating means from a closed position in which the liquid outlet is closed to an open position in which air may pass into the receiving bowl. Thus, the air valve opens and closes with the liquid outlet valve for smooth discharge of liquid from the measuring receiving bowl. Conveniently, the air valve member is fixed to the liquid valve member for simultaneous movement of the valve members on operation on the actuating means. This arrangement ensures smooth synchronous operation of the valve means.

Ideally also, the valve members associated with each liquid are interconnected for controlled simultaneous movement of the valve members on operation of the actuating means. Thus, the liquids are dispensed from the bowls at the same time.

In a particularly preferred embodiment of the invention the actuating means is operable by a receptacle such as a glass into which the liquids are to be delivered. Thus conveniently single handed operation is possible, with a user simply operating the actuating means with the glass for pouring the liquids into the glass. Preferably the actuating means comprises an actuating lever having engagement means for engaging by a receptacle. Typically, the engagement means comprises a receptacle receiving recess. This ensures positive secure engagement of the glass with the actuating lever.

In a preferred embodiment of the invention the actuation means includes an actuating linkage, the linkage having means to receive the actuating lever and means to engage the valve means for movement of the valve means between open and closed positions. Preferably the valve means includes an actuation shroud to which a valve member is fixedly mounted, the actuation shroud being engagable by the actuating lever to move the shroud and hence the valve member between open and closed positions.

Preferably, the actuation shroud is biassed towards a liquid outlet valve closing position. Thus, the liquid outlet valve is normally urged into the closed position.

In a further embodiment, each liquid inlet comprises a passage, the liquid inlet valve being slidably mounted in said passage, the liquid inlet valve having a valve stem of cruciform cross section extending through the passage with a valve member at a lower end of the stem for sealing engagement with an outlet of the passage. The cruciform cross section facilitates the controlled venting of air through the liquid inlet valve into a bottle while feeding liquid from the bottle into the measuring receiving bowl to charge the bowl for smooth filling of the bowl.

Conveniently, the liquid inlet valve and the liquid outlet valve are interconnected for synchronous operation.

In a preferred embodiment, the dispensing measure comprises a main body having a pair of measuring receiving bowls, each measuring receiving bowl for measuring a desired volume of liquid in the measuring receiving bowl, the relative volumes of the measuring receiving bowls being in a preselected desired ratio, each measuring receiving bowl having a liquid inlet and a liquid outlet, engagement means for separate engagement of each measuring receiving bowl with outlets of an associated pair of bottles, the liquid inlet for each measuring receiving bowl being incorporated in the engagement means, a normally open liquid inlet valve mounted at the liquid inlet, a normally closed liquid outlet valve mounted at the liquid outlet, each measuring receiving bowl having an air inlet, a normally closed air valve mounted at the air inlet, actuating means for operating the valve means, the actuating means operable to move the valves out of their normal positions to open each liquid outlet valve and each air valve and to close each liquid inlet valve, to deliver measured quantities of liquids from the measuring receiving bowls substantially concurrently.

BRIEF DESCRIPTION OF THE DRAWINGS

The invention will be more clearly understood from the following description thereof given by way of example only with reference to the accompanying drawings in which.

DETAILED DESCRIPTION

Figure 3:
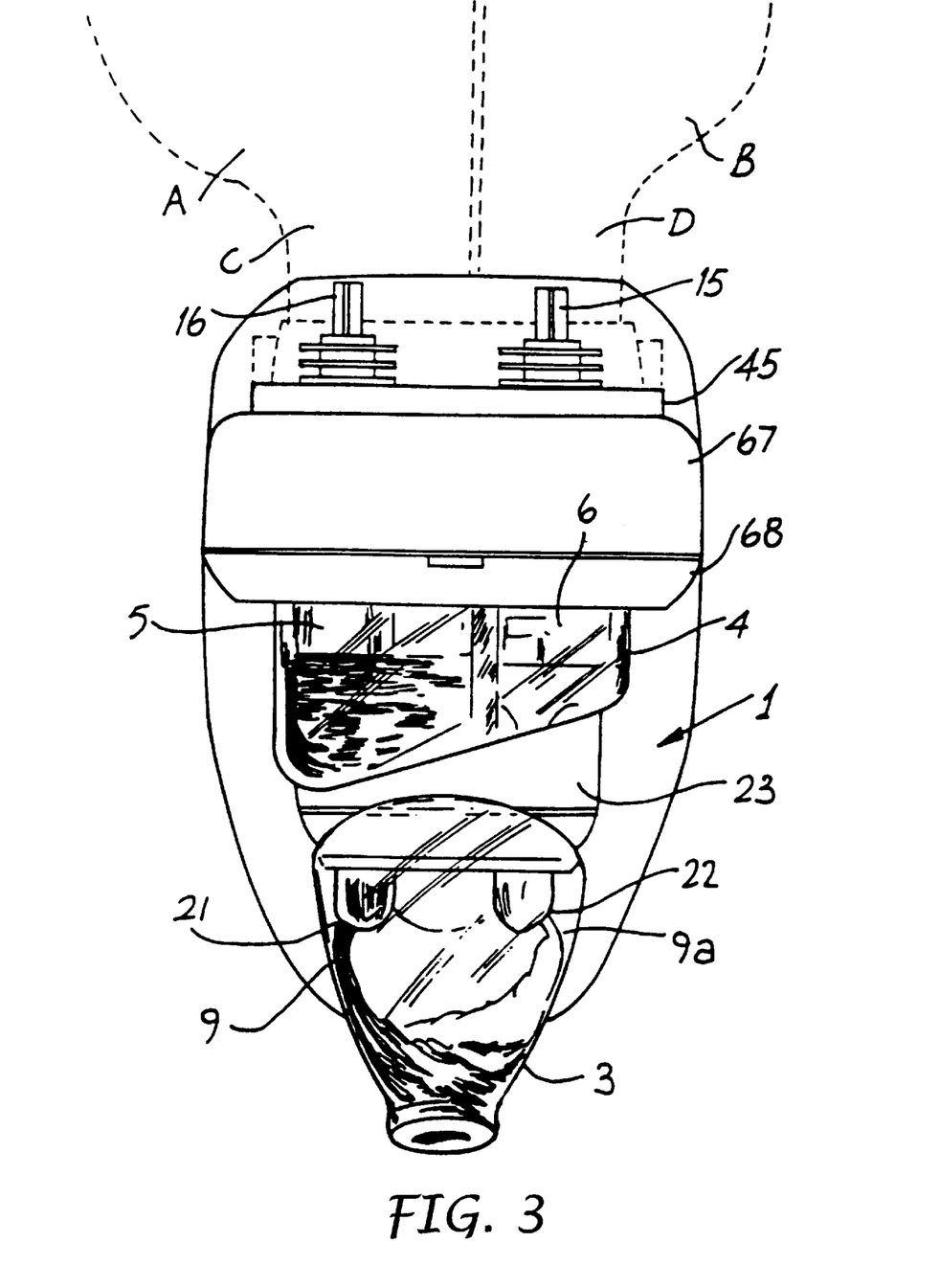
FIG. 3 is a front elevational view of the measure in use.

Referring to the drawings, there is illustrated a measure according to the invention and indicated generally by the reference numeral 1. The measure 1 is for delivering two different liquids, in this case black and white liqueurs from an inverted bottle (see FIG. 3) comprising two adjacent containers A, B having respective outlet necks C, D. The measure 1 according to the invention is fitted to the outlet necks C, D of the bottle and is mounted on a stand 2 for delivery of measured quantities of the black and white liqueurs concurrently in separate streams into a receptacle such as a glass 3.

The measure 1 has a main body forming a reservoir 4 of transparent material to allow the black and white liqueurs to be viewed during dispensing. The reservoir 4 has a pair of measuring receiving bowls 5, 6. Each bowl 5, 6 is associated with one of the containers A, B.

Each bowl 5, 6 has an air passageway 7, 8 closable by an air valve 10, 11 fitted with an air seal 12, 13. Passage of liquid from the containers A, B, through each bowl 5, 6 is controlled by a liquid valve 14, 15. Each liquid valve 14, 15 has an outlet liquid seal 16, 17 and an inlet liquid seal 18, 19 respectively. Each inlet liquid seal 18, 19 is engageable with a liquid inlet 20, 20a of each bowl 5, 6. The bowls 5, 6 have liquid outlets 21, 22 which are normally closed by the outlet liquid seals 16, 17. It will be noted that the outlets 21, 22 are at an angle to the longitudinal and the seals 16, 17 are arranged correspondingly. The outlets 21, 22 are arranged to deliver the black and white liqueurs to different locations in a glass 3, in this case to deliver the liqueurs substantially concurrently in separate divergent streams 9, 9a (FIG. 3) to opposite sides of a glass 3 to ensure that the liqueurs remain separated within the glass 3. The size of the outlets 21, 22 is arranged to deliver a ratio of flow of black to white liqueur of 2:1. The outlets 21, 22 are provided in outlet spigots 21a, 22a which are partially covered, on assembly, by a cover 23.

Figure 10:
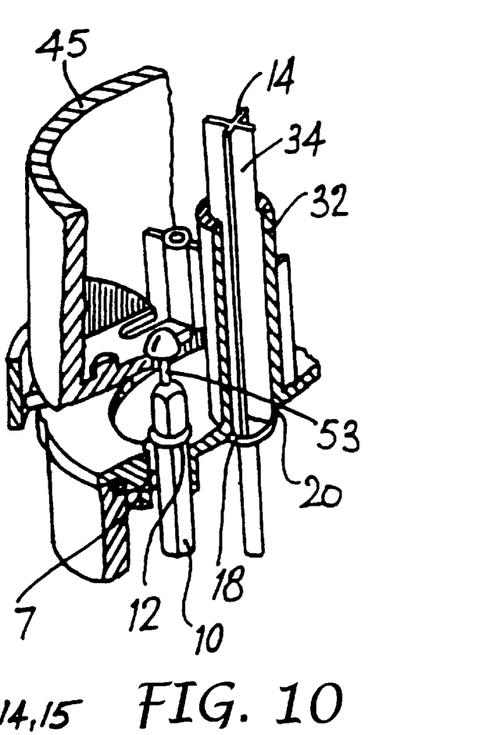
FIG. 10 is a perspective view of the part of FIG. 9 in another position of use.
Figure 10A:
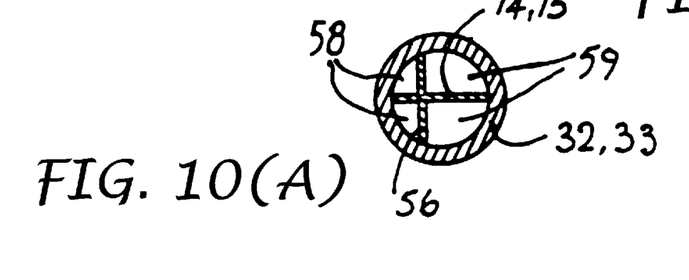
FIG. 10A is a cross sectional view of a reed detail of the measure.
Figures 11, 12:
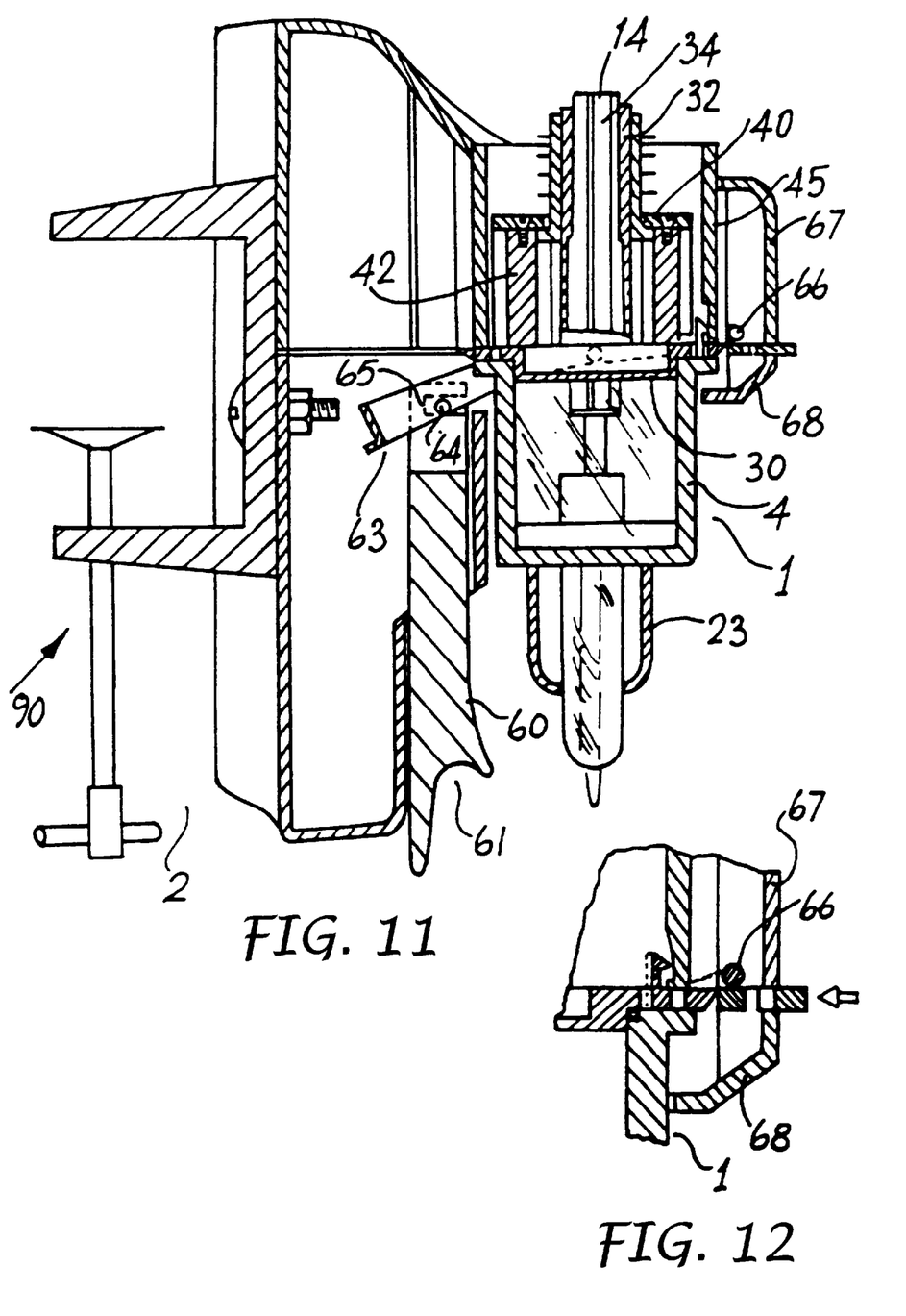
FIG. 11 is a side cross sectional view of the assembly of the measure with an actuator.
FIG. 12 is a cross sectional view on an enlarged scale of part of the actuator.
Figure 13:
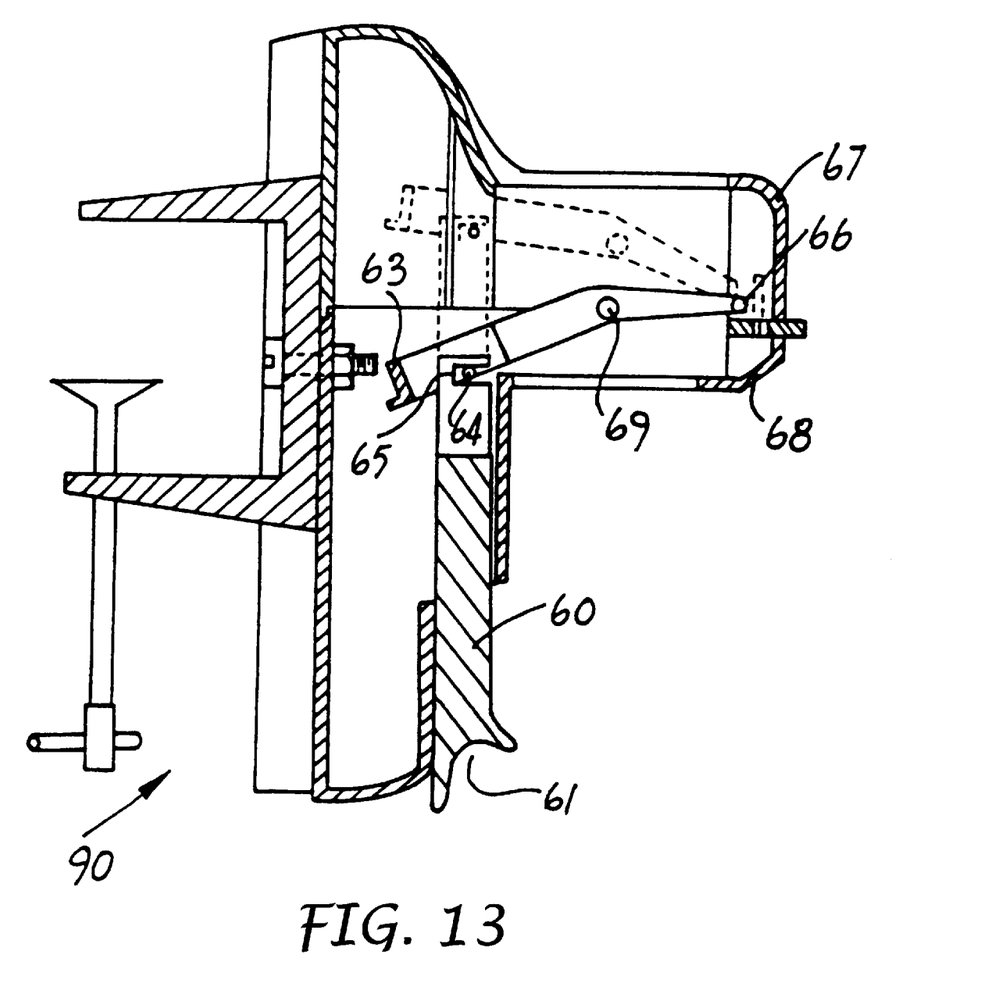
FIG. 13 is a cross sectional view of the actuator assembly.
Figures 14, 15, 16:
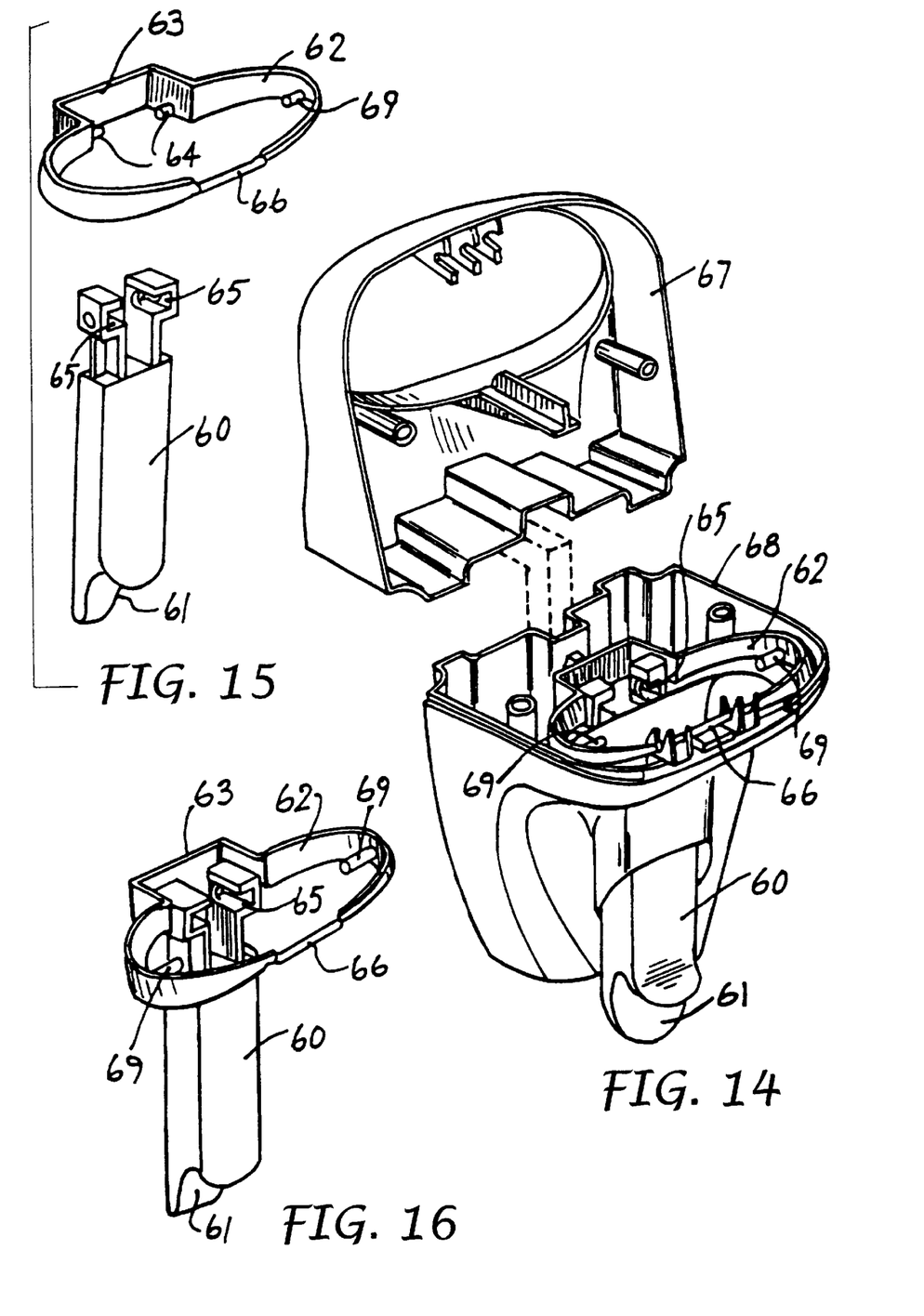
FIG. 14 is a perspective, partially exploded view of the actuator assembly.
FIG. 15 is an exploded view of part of the actuator.
FIG. 16 is a perspective view of the actuator part of FIG. 15, assembled.

The air and liquid valves for each bowl 5, 6 are in this case provided by single valve members 28, 29 which are typically of plastics material. It will be noted that upper parts 34, 35 of the liquid valves 14, 15 are of generally cruciform shape in transverse cross section (as shown in FIG. 10a) for controlling the flow of liquid from the containers A, B into the bowls 5, 6.

The reservoir 4 is assembled to a base plate 30 by fixing screws passing through associated holes 31 in a flanged upper rim of the reservoir 4 and in the base plate 30. The base plate 30 has a pair of spaced-apart upstanding cylindrical sleeves 32, 33 to house upper parts 34, 35 of the liquid valve members 14, 15 which slidably engage within the sleeves 32, 33. A retention plate 40 is fixed by screws 41 to associated upstanding tubular mounting posts 42 on the base plate 30.

An actuation shroud 45 is interposed between the base plate 30 and the retention plate 40. Coil springs 46 bias the shroud 45 downwardly away from the retention plate 40 into a rest position as will be described in more detail below. Liquid bottle-neck seals 47 are also retained in holes 48 in the retention plate 40, on assembly, the seals 47 sitting around an upper end of each sleeve 32, 33. Each seal 47 has a tubular body with a plurality of spaced-apart resiliently deformable radial fins 47a for engagement within the neck of a container A, B.

The valve members 28, 29 are locked to the actuation shroud 45 by fixing upper free ends of the air valve parts 10, 11 to mountings 50, 51 in the shroud 45. Each of the mountings 50, 51 of the shroud 45 have snap fit projections 52 which snap fittingly engage on assembly with corresponding grooves 53 at the upper ends of the air valve members 10, 11.

The actuation shroud 45 forms part of an actuator for operating the valve members 28, 29 to allow the liquid to flow concurrently into a glass 3. Referring particularly to FIGS. 11 to 16, the actuator also includes an actuating lever 60 having engagement means provided by a receptacle engaging recess 61, and an actuating linkage 62. The linkage 62 has a rear mounting part 63 with inwardly projecting pins 64 which are fixed in upper end mountings 65 of the lever 60. The linkage 62 also includes a front mounting 66 which is mounted between upper and lower casing parts 67, 68 which house the linkage 62 and lever 60 so that the linkage 62 pivots about the front mounting 66.

In this case the actuator housing is adapted for shelf mounting by a screw bracket 90. However, many other mountings may be provided.

Figure 1:
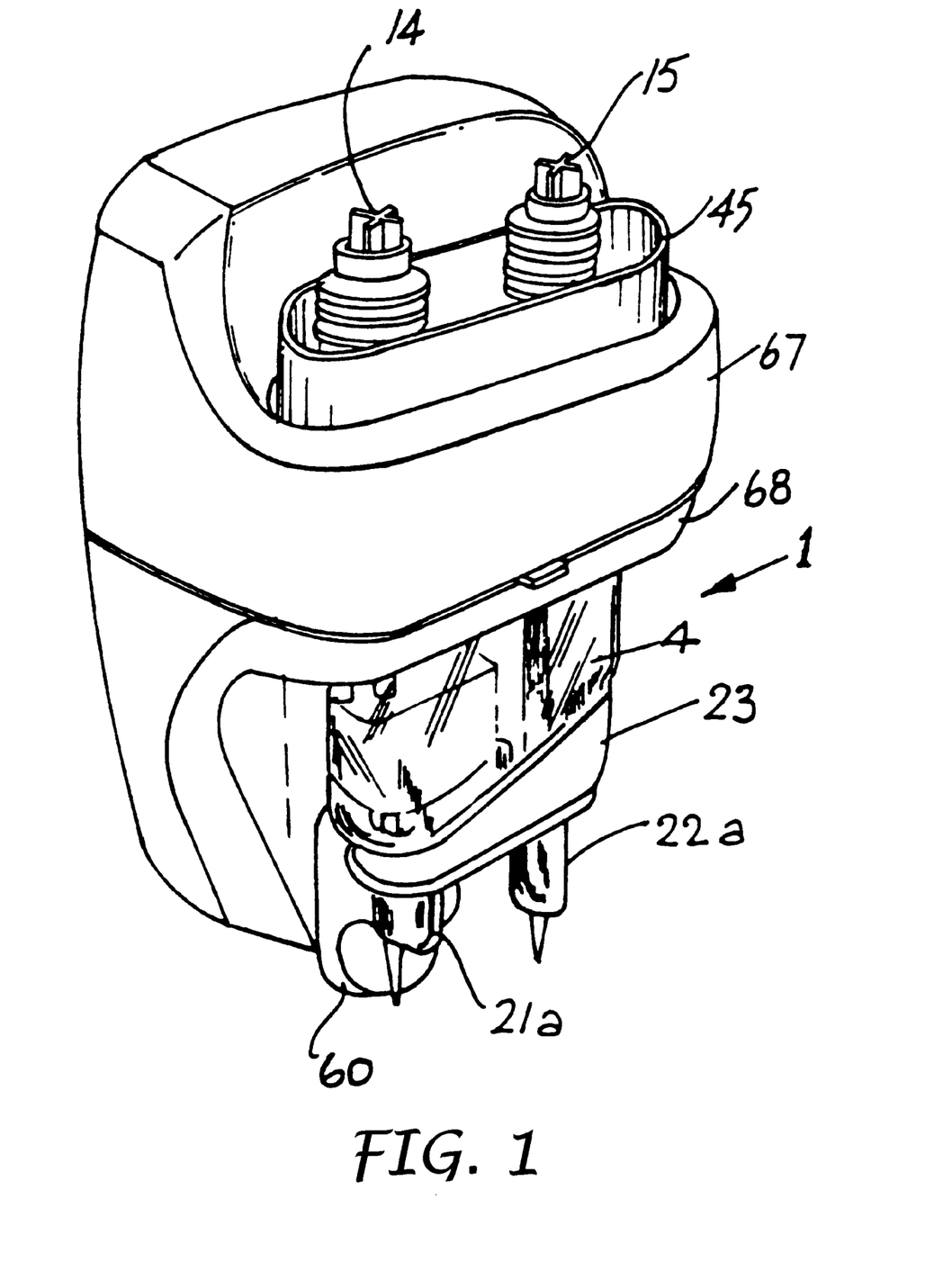
FIG. 1 is a perspective view of a dispensing measure according to the invention.
Figure 2:
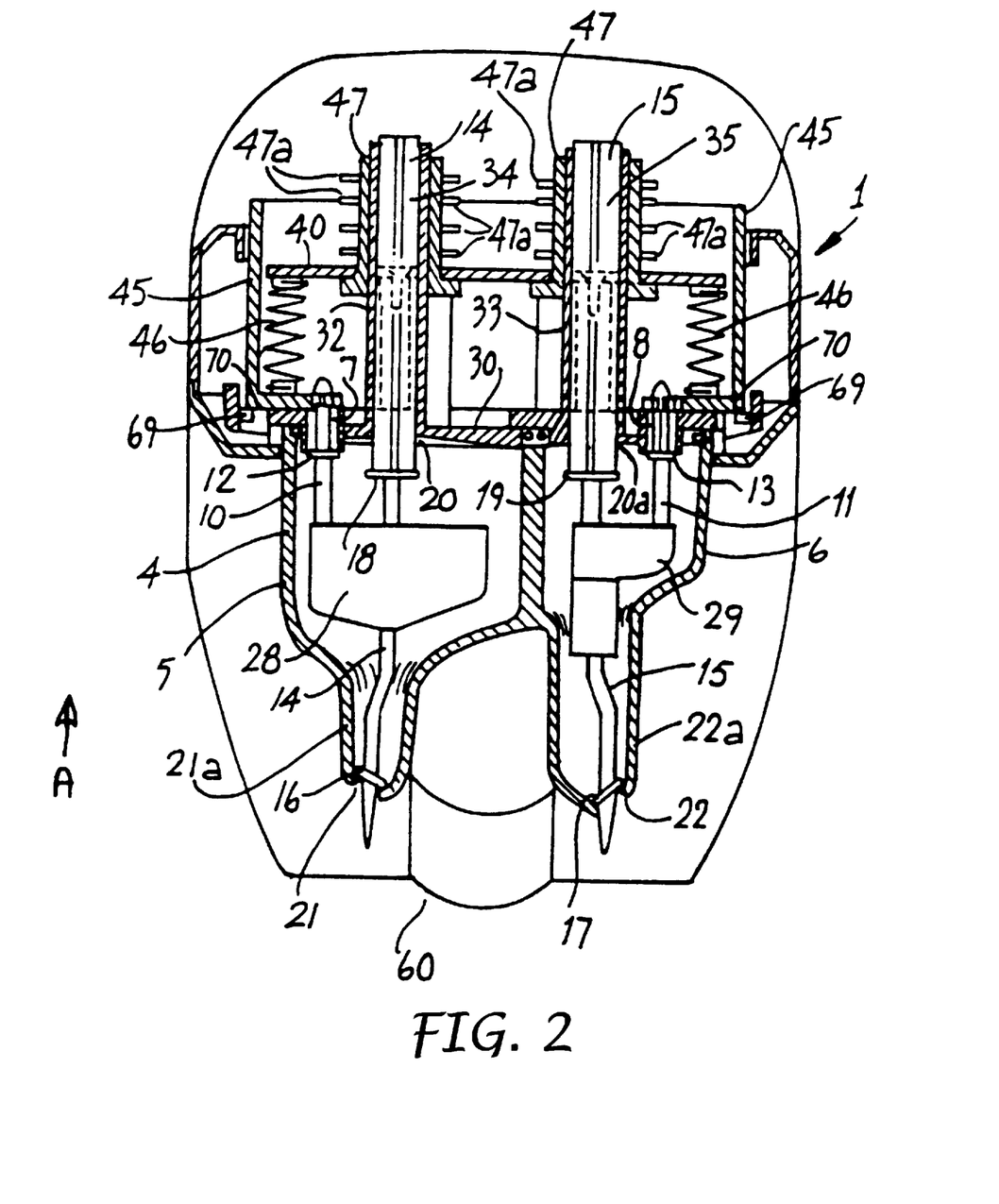
FIG. 2 is a front cross sectional view of the measure of FIG. 1.
Figures 6, 7:
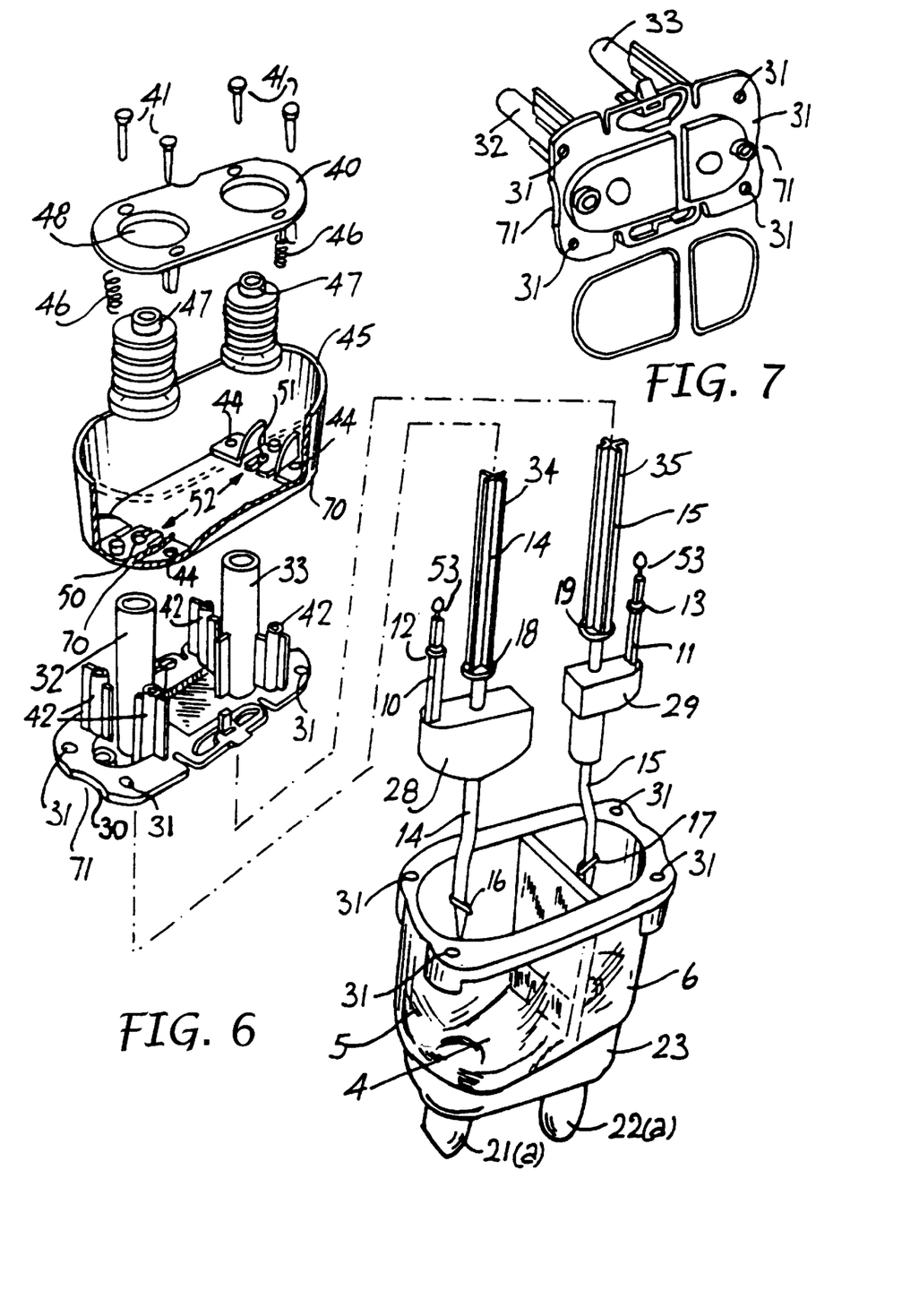
FIG. 6 is an exploded view of the measure.
FIG. 7 is an exploded view of part of the measure.
Figure 8:
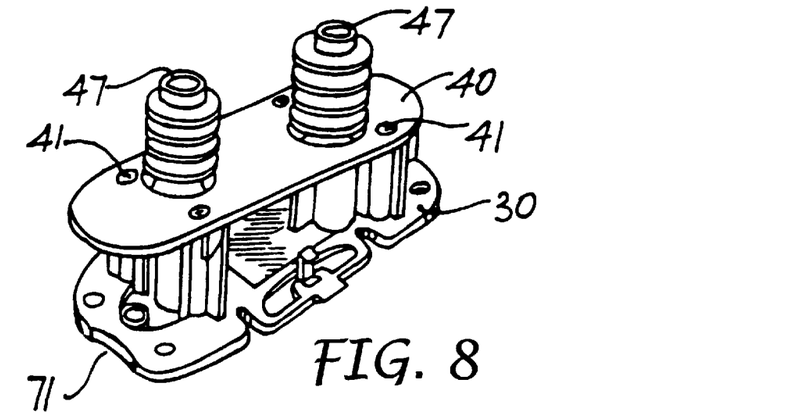
FIG. 8 is a perspective view of part of the measure.
Figure 9:
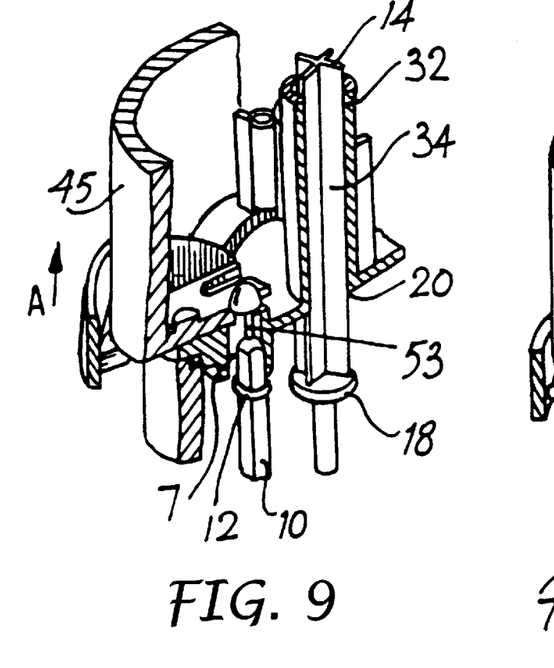
FIG. 9 is a perspective partially cross sectional view of a detail of the measure in one position of use.

The linkage 60 is of ring-like shape and spud projections 69 extend inwardly and engage, on assembly, with underside portions 70 of the shroud 45 (see FIG. 2). The base plate 30 includes side edge portions 71 (best seen in FIG. 6)which are cut-away to facilitate engagement of the spuds 69 with the shroud 45.

Figure 4:
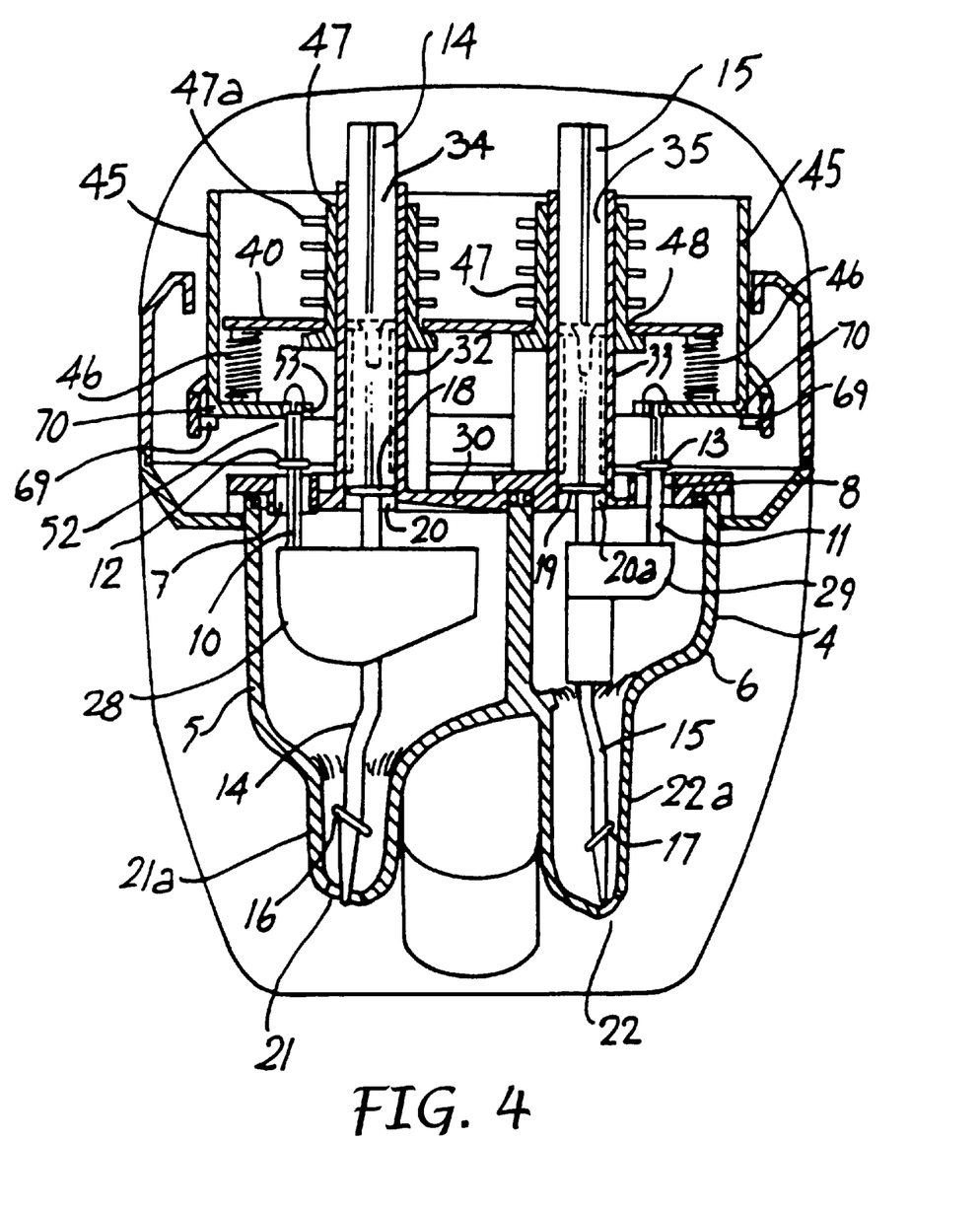
FIG. 4 is a front cross sectional view of the measure in a dispensing position.
Figure 5:
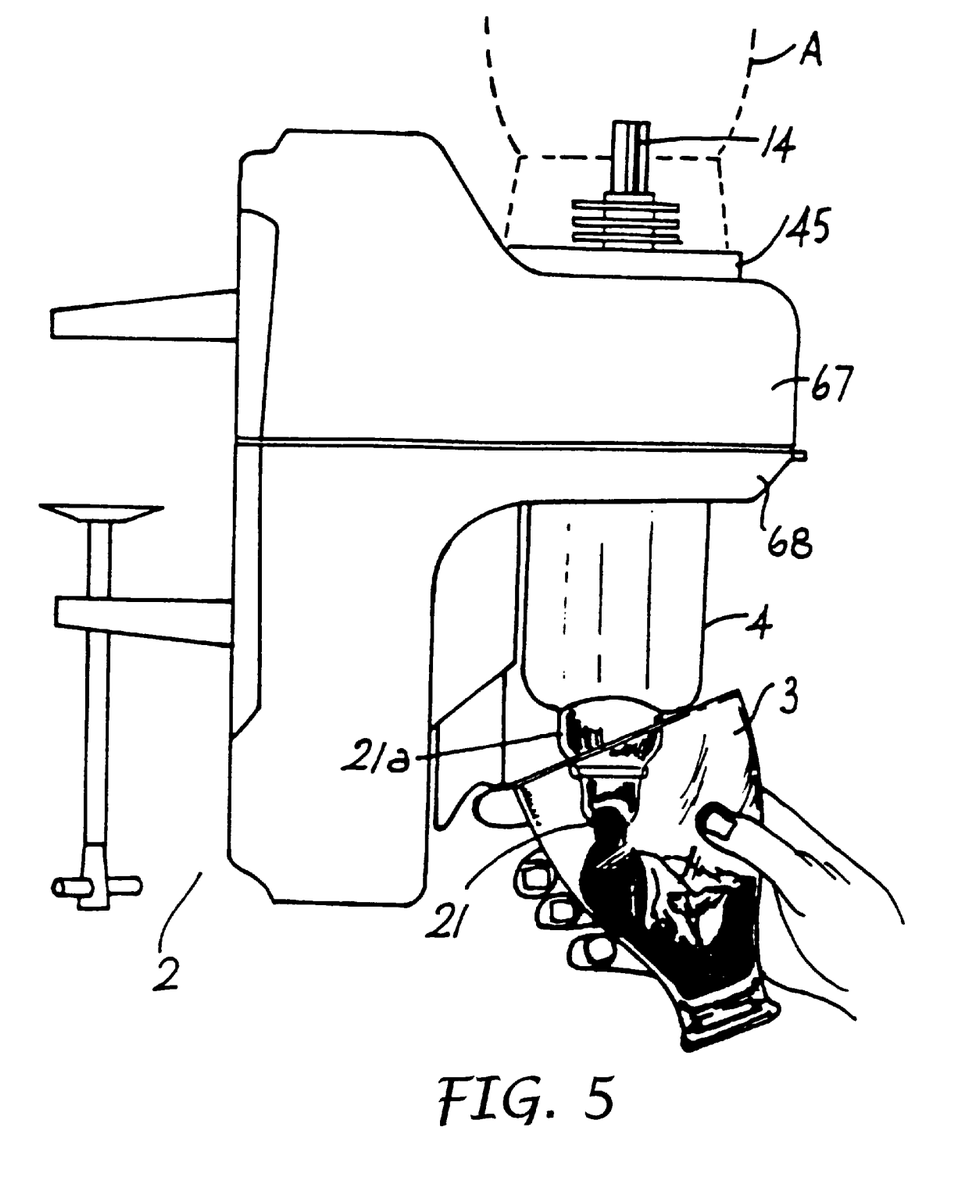
FIG. 5 is a side view of the measure in use.

In use, the lever 60 is pushed upwardly by the glass 3 against the biassing of the springs 46. This causes the linkage 62 to pivot about the front mounting 66 and, by virtue of the spuds 69 engaging the underside portions 70 of the shroud 45, the shroud 45 is lifted upwardly in the direction of the arrow A (FIG. 2). This lifts the valve members 28, 29 upwardly from the rest or sealed position illustrated in FIG. 2 in which the liquid outlets 21, 22 are sealed by the liquid seals 16, 17 to a release or open position illustrated in FIG. 4. In the release position, the liquid seals 16, 17 are moved out of the outlets 21, 22 substantially simultaneously to allow the black and white liqueurs to flow substantially concurrently into the glass 3.

When the measured quantity of black and white liqueurs have been delivered as determined by the volumes of the bowls 5, 6 of the reservoir 4, the glass 3 is released. As the liquids are delivered to opposite sides of the glass, the desired separation of the black and white liquids is achieved. When the measured quantity of liqueurs has been delivered, the bowls 5, 6 are automatically refilled with another measure of black and white liqueurs by gravity feed from the containers A, B of the inverted bottle.

As the valve members 28, 29 lift the inlet liquid seals 18, 19 engage and close the liquid inlets 20, 20*a* communicating through the sleeves 32, 33 with the containers A, B preventing inflow of liquid from the containers A, B to the bowls 5, 6 as the measured quantities of liqueur are being dispensed to the glass 3.

As the valve members 28, 29 are returned to their rest position, the sleeves 32, 33 are opened as the liquid seals 18, 19 are removed from the sleeves 32, 33. This allows the black and white liqueurs to enter and recharge the bowls 5, 6 of the reservoir 4.

Referring to FIG. 10*a,* the upper parts 34, 35 of the liquid valve members 14, 15 have a reed feature 56 which is offset to define air passageways 58 and larger liquid passageways 59. Air travels from each bowl 5, 6 through the smaller air passageways 58 via the bowl inlet 20, 20*a* and sleeve 32, 33 to the associated sub-container A, B allowing liqueur to travel down the larger liquid passageways 59 to the bowl 5, 6 by gravity flow.

Many variations on the specific embodiment of the invention will be readily apparent and accordingly the invention is not limited to the embodiment hereinbefore described which may be varied in construction and detail.

We claim:

1. A dispensing measure for substantially concurrent delivery of measured quantities of at least two different liquids from associated containers, the measure comprising:

a head part having separate engagement means for engagement with the necks of adjacent containers, each engagement means having a liquid inlet closable by a liquid inlet valve means;

a measuring receiving bowl associated with each liquid inlet, each measuring receiving bowl having an air passageway closable by an air valve means, and a liquid outlet closable by a liquid valve outlet means; and actuating means for simultaneously operating the outlet valve means to deliver measured quantities of liquids from at least two of the measuring receiving bowls.

the liquid outlets being arranged for substantially direct delivery of separate divergent streams of the liquids from the measuring receiving bowls into a receptacle without mixing to provide a layered effect in the receptacle with one liquid layer lying on top of the second liquid layer.

2. A dispensing measure as claimed in claim 1, wherein the liquid outlets are arranged for delivery of the liquids to opposite sides of a receptacle.

3. A dispensing measure as claimed in claim 1, wherein the angle between the axes through adjacent liquid outlets is at least 90°.

4. A dispensing measure as claimed in claim 3, wherein the angle is approximately 120°.

5. A dispensing measure as claimed in claim 1, wherein the liquid outlets are at substantially the same level.

6. A dispensing measure as claimed in claim 1, wherein the liquid valve means comprises a liquid valve member extending through the measuring receiving bowl from the liquid outlet to the liquid inlet, the valve member being movable in the measuring receiving bowl by the actuating means from a closed position in which the liquid outlet is sealed to an open position in which liquid is delivered from the measuring receiving bowl.

7. A dispensing measure as claimed in claim 6, wherein the valve member is movable by the actuating means from a normally closed position in which the liquid outlet is sealed to a released open position for delivery of liquid from the measuring receiving bowl.

8. A dispensing measure as claimed in claim 6, wherein the air valve means comprises an air valve member extending through an air inlet to the measuring receiving bowl, the air valve member being movable in the measuring receiving bowl by the actuating means from a closed position in which the liquid outlet is closed to an open position in which air may pass into the measuring receiving bowl.

9. A dispensing measure as claimed in claim 8, wherein the air valve member is fixed to the liquid valve member for simultaneous movement of the valve members on operation of the actuating means.

10. A dispensing measure as claimed in claim 1, wherein the actuating means is operable by a receptacle into which the liquids are to be delivered.

11. A dispensing measure as claimed in claim 10, wherein the actuating means comprises an actuating lever having engagement means for engaging by a receptacle.

12. A dispensing measure as claimed in claim 11, wherein the engagement means comprises a receptacle receiving recess.

13. A dispensing measure as claimed in claim 1, wherein the actuation means includes an actuating linkage, the linkage having means to receive the actuating lever and means to engage the valve means for movement of the valve means between open and closed positions.

14. A dispensing measure as claimed in claim 13, wherein the valve means includes an actuation shroud to which a valve member is fixedly mounted, the actuation shroud being engageable by the actuating lever to move the shroud and hence the valve member between open and closed positions.

15. A dispensing measure as claimed in claim 14, wherein the actuation shroud is biased towards a liquid outlet valve closing position.

16. A dispensing measure as claimed in claim 1, wherein each liquid inlet comprises a passage, the liquid inlet valve being slidably mounted in said passage, the liquid inlet valve having a valve stem of cruciform cross section extending through the passage with a valve member at a lower end of the stem for sealing engagement with an outlet of the passage.

17. A dispensing measure as claimed in claim 1, wherein the liquid inlet valve and the liquid outlet valve are interconnected for synchronous operation.

18. A dispensing measure as claimed in claim 1, wherein the relative volumes of the measuring receiving bowls being in a preselected desired ratio.

\* \* \* \* \*